United States Patent [19]

Okisu et al.

[11] Patent Number: 4,916,472

[45] Date of Patent: Apr. 10, 1990

[54] AUTOMATIC FOCUS CONTROL DEVICE FOR CAMERA

[75] Inventors: Noriyuki Okisu; Tokuji Ishida; Masataka Hamada; Kenji Ishibashi, all of Osaka, Japan

[73] Assignee: Minolta Camera Kabushiki Kaisha, Osaka, Japan

[21] Appl. No.: 352,364

[22] Filed: May 16, 1989

[30] Foreign Application Priority Data

May 16, 1988 [JP] Japan ................................. 63-118795
May 27, 1988 [JP] Japan ................................. 63-130844

[51] Int. Cl.⁴ .............................................. G03B 3/10
[52] U.S. Cl. .................................... 354/402; 250/201.2
[58] Field of Search ............... 354/400, 402, 403, 406, 354/407, 408; 250/201, 201 PF, 201 AF, 204

[56] References Cited

U.S. PATENT DOCUMENTS

| | | | |
|---|---|---|---|
| 4,509,841 | 4/1985 | Sakai et al. | 354/402 |
| 4,538,892 | 9/1985 | Sakai et al. | 354/402 |
| 4,617,459 | 10/1986 | Akashi et al. | 354/402 X |
| 4,825,239 | 4/1989 | Suda et al. | 354/402 |

OTHER PUBLICATIONS

Patent Abstracts of Japan, Document No. 58-24123, 41 P 194.
Patent Abstracts of Japan, Document No. 61-165716, 103 P 526.
Patent Abstracts of Japan, Document No. 63-172231, 59 P 790.

Primary Examiner—W. B. Perkey
Attorney, Agent, or Firm—Burns, Doane, Swecker & Mathis

[57] ABSTRACT

An auto-focus camera includes focus detection means for detecting the focussing state of a photographic lens, reliability discriminating means for discriminating whether the result of the focus detection means is reliable, first drive control means for driving the photographic lens to a position determined from the result of the focus detection means when the reliability discriminating means discriminates that the result is reliable, second drive control means for driving the photographic lens in a predetermined direction when the reliability discriminating means discriminates that the result is unreliable, and means for executing operations necessary for focussing during the predetermined direction driving, such as judgement as to whether a reverse driving is necessary, calculation of the driving amount of the photographic lens to an in-focus position.

7 Claims, 8 Drawing Sheets

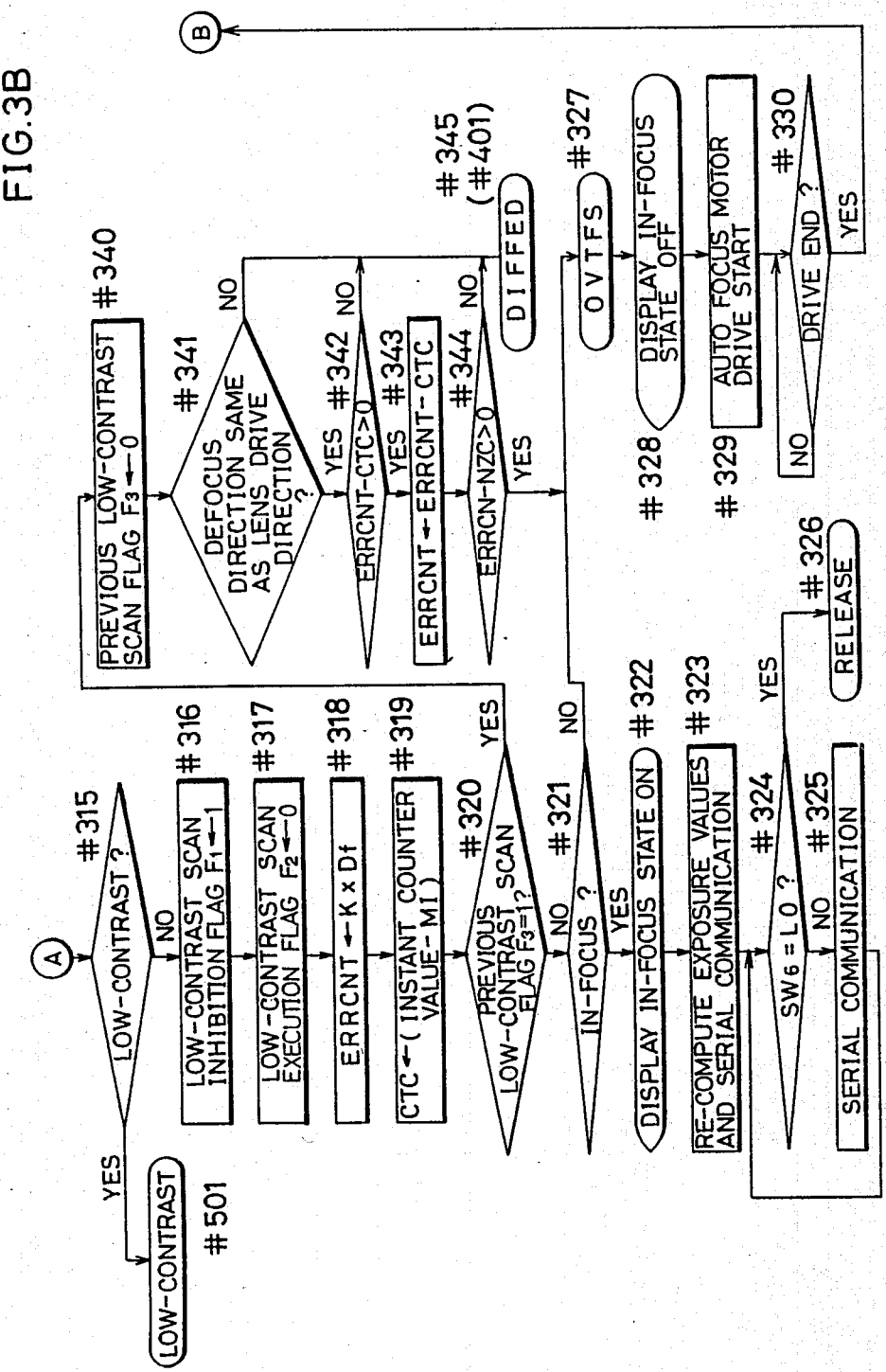

AUTOMATIC FOCUS CONTROL DEVICE FOR CAMERA

BACKGROUND OF THE INVENTION AND RELATED ART STATEMENT

The present invention relates to a camera and, more particularly, to a camera having an auto-focus function.

Cameras are known having a so-called auto-focus function which performs an automatic focussing control in accordance with the result of a focus detection which is conducted by a focus detector on the basis of lights reflected by a photographing object. Known focus detectors used on this type of cameras, however, are capable of performing focus detection only when the amount of defocus, i.e., the amount of deviation of an image-formed position of the object formed by the photographic lens from a predetermined focal position, falls within a predetermined range. In other words, known focus detectors cannot detect focus condition when the amount of defocus exceeds the predetermined range. To obviate this problem an art is proposed in, for example, Japanese Patent Unexamined Publication (KOKAI) No. 61-45212, in which the photographic lens is moved to a different position while detecting the focus condition when the focus detection is failed, and the detection of the infocus position is performed after the photographic lens has come into a region which enables the focus detection. This control method is generally referred to as "low-contrast scan".

FIG. 9(a) shows the state of movement, i.e., positions of the photographic lens during automatic focus adjusting operation in the low-contrast scan mode, while FIG. 9(b) shows the flow of a sequence of the low-contrast scan process. since the sequence control of the low-contrast scan mode is performed during movement of the photographic lens, FIG. 9(a) shows the lens position at each step of the low-contrast scan process shown in FIG. 9(b).

In these Figures, DFCA1 and DFCA2 represent defocus coverage ranges which enable correct focus detection at the respective focus detecting moments. These defocus coverage ranges are shown in terms of the ranges over which the photographic lens is drivable. Thus, the lens drivable range which determines the defocus coverage range changes in accordance with the movement of the photographic lens. A symbol A represents the position of the photographic lens on which in-focus state with respect to a photographing object is attained.

The low-contrast scan process for detecting a focus condition will be explained on an assumption that the focus detection is conducted during the movement of the photographic lens from the infinite end phorographing position ∞ of the lens to the closest end photographing position of the lens.

During the low-contrast scanning operation, when the in-focus position A is within the defocus coverage range DFCA1, a charge accumulating operation for focus detection is performed by a focus detection light-receiving means (CCD) in a step represented by INTEGRATION 1. Then, in a step represented by DATA DUMP 1, the charges accumulated in INTEGRATION 1 and representing the data concerning the Light image received from the object are delivered to a microcomputer (CPU). Then, in a step represented by CALCULATION 1, a focus detection calculation is performed by the CPU, whereby a defocus amount represented by DFN in FIG. 9(b) is determined. However, since the photographic lens moves even during execution of the steps INTEGRATION 1 to CALCULATION 1, the lens has been moved by an amount CTC from the lens position at the step INTEGRATION 1, when the defocus amount DFN is determined at the end of the step CALCULATION 1. Thus, the lens may have been moved beyound the in-focus position A. In such a case, a control is executed to stop the movement of the lens without delay after the completion of the step CALCULATION 1. In response to this control, the lens stops after making an over-run by a distance OVRN due to inertia of the auto-focus motor and other parts. When the photographic lens is stopped, steps INTEGRATION 2 and CALCULATION 2 are executed to perform the focus detection for the purpose of confirmation of the in-focus position A.

Thus, in the known system, the focus detection is performed again through execution of the steps INTEGRATION 2 and CALCULATION 2, thus confirming the in-focus position A. It is, however, conceivable that the in-focus position A cannot be found due to a fact that the defocus coverage range has been shifted to DFCA2 as a result of the lens movement during focus-detection and the over-run of the lens after the control. In such a case, the CPU judges that focus cannot be found int eh focus detecting operation performed int eh step CALCULATION 2. In such a case, it is impossible to obtain the in-focus position of the photographic lens. Focus detection failure may also be experienced due to repetition of the low-contrast scan operation, even if the in-focus position is within the defocus coverage range DFCA 2. Therefore, when the focus detection is judged as being impossible in the step CALCULATION 2, the amount of movement of the lens to the in-focus position A is calculated by making use of the result of the focus detection conducted through the step INTEGRATION 1 to CALCULATION 1, and a control is performed to reverse the photographic lens so as to avoid focus detection failure.

As has been explained, the known system has a drawback in that the lens may have been moved beyond an in-focus position when the calculation of the defocus amount is completed, because the moving speed of the photographic lens during low-contrast scan is set very high, so that the focus detecting operation has to be conducted again after the stop of the photographic lens, for the purpose of confirmation of the in-focus position. In addition, when the in-focus position is out of the defocus coverage range after the stop of the lens, the focus detection is judged as being impossible and, in response to this judgment, the control is executed to reverse the lens movement in accordance with the result of the calculation of the distance to the in-focus position on the basis of the result of the preceding focus detecting operation. In consequence, a long time is required for the focus detection, as well as for reverse driving of the lens to the in-focus position, after the stop of the photographic lens. In particular, a considerably long time is consumed for stopping and reversing the photographic lens to the in-focus position. For these reasons, the known auto-focus system could not be used with a full satisfaction.

SUMMARY OF THE INVENTION

Accordingly, an object of the present invention is to provide an auto-focus camera which is capable of shortening the time required for a photographic lens to be brought to an in-focus position.

According to the present invention, an auto-focus camera comprises focus detection means for detection the focussing state of a photographic lens, reliability discriminating means for discriminating whether the result of the focus detection mean is reliable, first drive control means for driving the photographic lens to a position determined from the result of the focus detection means when the reliability discriminating means discriminates that the result is reliable, second drive control means for driving the photographic lens in a predetermined direction with allowing the focus detection means and the reliability discriminating means to execute when the reliability discriminating means discriminates that the result is unreliable, judging means for judging whether a reverse driving of the photographic lens is necessary when the reliability discriminating means discriminates that the result of the focus detection means is reliable during the predetermined direction driving, and third drive control means for driving the photographic lens in the reverse direction to a position determined from the instant result of the focus detection performed by the focus detection means when the judging means judges that the reverse driving is necessary.

Another auto-focus camera of the present invention comprises focus detection means for detecting the focussing state of a photographic lens, reliability discriminating means for discriminating whether the result of the focus detection means is reliable, first drive control means for driving the photographic lens to a position determined from the result of the focus detection means when the reliability discriminating means discriminates that the result is reliable, second drive control means for driving the photographic lens in a predetermined direction with allowing the focus detection means and the reliability discriminating means to execute when the reliability discriminating means to execute when the reliability discriminating means discriminates that the result is unreliable, first lens position detection means for detecting the instant position of the photographic lens when the reliability discriminating means discriminates that the result of the focus detection means is reliable during the predetermined direction driving, stopping means for stopping the driving of the second drive control means when the reliability discriminating means discriminates that the result of the focus detection means is reliable during the predetermined direction driving, second lens position detection means for detecting the position at which the photographic lens is stopped by the stopping means, first calculation means for calculating the positional difference between the position obtained by the first lens position detection means and the position obtained by the second lens position detection means, second calculation means for calculating the instant defocus amount of the photographic lens when the reliability discriminating means discriminates that the result of the focus detection means is reliable during the predetermined direction driving, and third calculation means for calculating the driving amount of the photographic lens determined on the basis of the positional difference obtained by the first calculation means and the defocus amount obtained by the second calculation means.

Thus, the automatic focus control device used for an auto-focus camera of the present invention eliminates problem such as a focus detection failure attributable to over-run of the in-focus position and shortens the time required for the lens to be reversed to the in-focus position, while eliminating the wasteful time which has been necessitated in known auto-focus cameras for the purpose of focus detection after a temporary stopping of the lens.

These and other objects, features and advantage of the present invention will become more apparent upon a reading of the following detailed description and drawings.

BRIEF DESCRIPTION OF DRAWINGS

FIGS. 3A, 3B, 4, and 5 are flow charts explanatory of the auto-focus operation of the auto-focus camera of the present invention;

DETAILED DESCRIPTION OF PREFERRED EMBODIMENTS

Principle of automatic focussing operation will be explained first.

In a known focus detector, light beams from a photographing object are made to pass through first and second regions which are symmetrical with each other with respect to the optical axis of the photographic lens and are made to form respective images. The amount of defocus representing deviation of an image-formed position of the object formed by the photographic lens from an expected focal plane and direction of defocus with respect to the expected focal plane are determined by calculating positional relationship between the two images.

Figure 6:
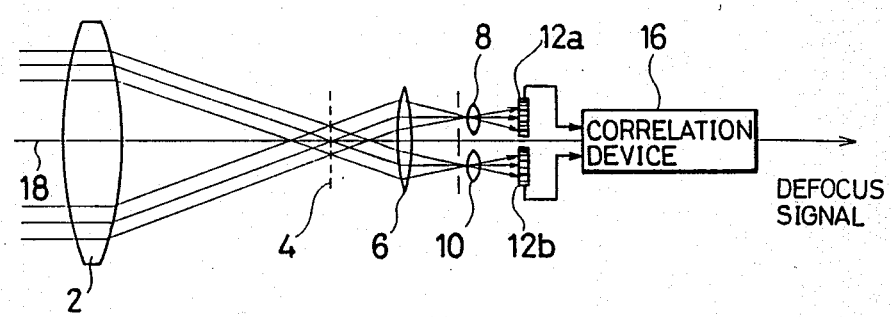
FIGS. 6, 7, and 8 are diagrammatic illustrations of an optical system explaining the theory of focus detecting operation.

Referring to FIG. 6 which shows the construction of an optical system capable of performing the above-described focus detecting opertion, the expected focal plane 4 is located behind a photographic lens 2. A condenser lens 6 is deposed at a position corresponding to a position behind the focal plane 4. Re-imaging lenses 8 and 10 are arranged behind the condenser lens 6 in symmetry with each other with respect to the optical axis 18 of the photographic lens 2. Linear image sensors 12a and 12b such as CCD, are disposed at focal planes of the re-imaging lenses 8 and 10 respectively.

Figure 7:
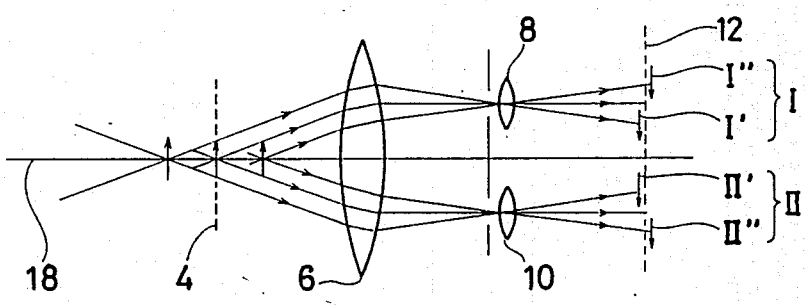

FIG. 7 schematically illustrates the focus detection performed by the optical system of FIG. 6. In FIG. 7, the image sensors 12a, 12b are integratedly shown as a single linear image sensor 12. In a state so-called "front-focus" in which the image of the photographing object to be focused is formed at the fornt side (left side as viewed in FIG. 7) of the focal plane 4, the images I and II on the image sensor approach the optical axis 18 as denoted by I' and II', i.e., the distance between these images becomes smaller. Conversely, in a state so-called "rear-focus" in which the object image is formed at the rear side (right side as viewed in FIG. 7) of the focal plane 4, the images I and II on the image sensor 12 move apart from the optical axis 18, i.e., the distance between these images becomes greater. It is therefore possible to judge the state of focussing on the photographing object, by detecting the distance between these images I and II. The distance between these two images is limited by the construction of the focus detecting optical system, so that the focus detecting operation is possible only within a given range of object distance.

The amount of movement of the photographic lens 2 required for causing the object image to be focused on the expected focal plane 4, i.e., the defocus amount DF, can be calculated by the following process.

Figure 8:
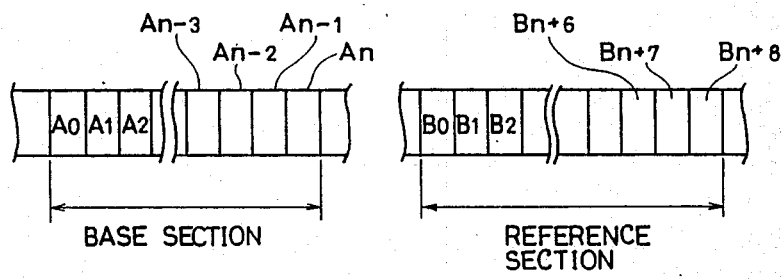
Figures 9A, 9B:
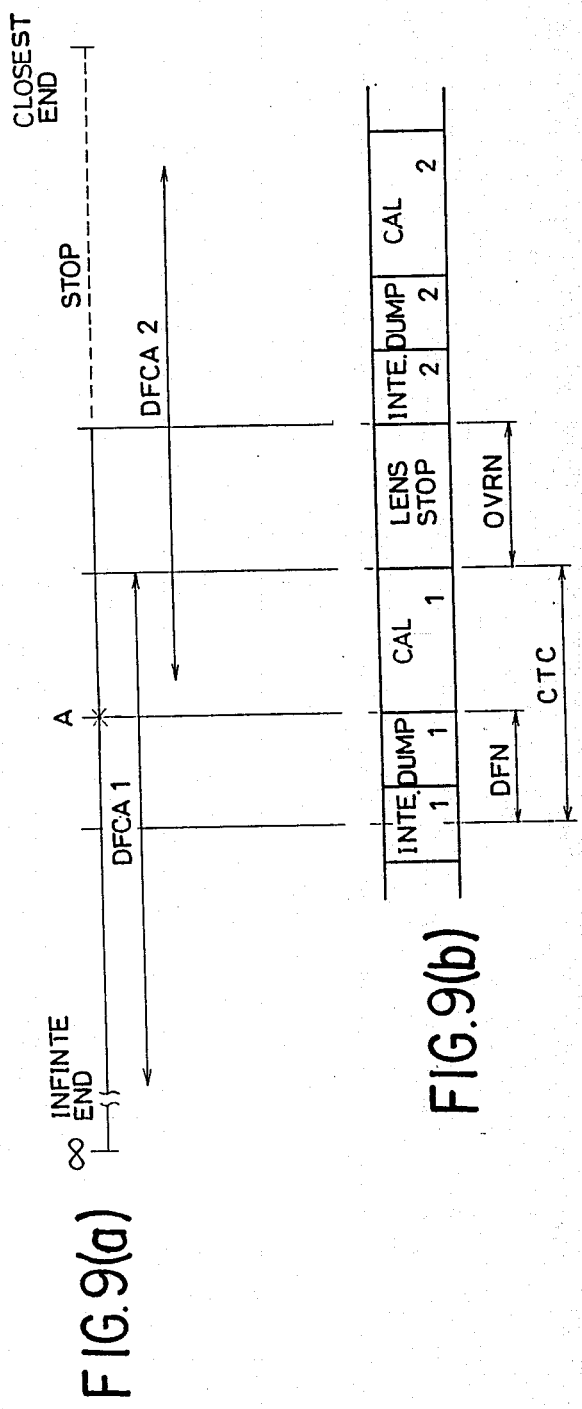
FIGS. 9(a) and 9(b) are illustrations of low-contrast scan process conducted in a known automatic focus control device.

FIG. 8 shows an arrangement of pixels on the image sensor 12. The image formed on the image sensor 12 by the re-imaging lens 8 is distributed over the pixels $A_0$ to $A_n$. These pixels $A_0$ to $A_n$ produce pixel signals $Is_0$ to $Is_n$ in accordance with the quantity of light received by these pixels. Similarly, the image II formed on the image sensor 12 by the re-imaging lens 10 is distributed over the pixels $B_0$ to $B_{n+8}$. These pixels $B_0$ to $B_{n+8}$ produce pixel signals $Ib_0$ to $Ib_{n+8}$ in accordance with the quantity of light received by these pixels.

The sections of the image sensor provided by the pixels ($A_0$ to $A_n$) and ($B_0$ to $B_{n+8}$) will be referred to as a base section and a reference section. The distance between the images I and II can be obtained by finding most resembling or conforming portions of the images on the base and reference sections and measuring the distance between these portions of both images, and the defocus amount DF which has to be traveled by the photographic lens to reach the in-focus position is obtained from the determined distance between two images.

The comparison between two images is practically conducted by the following method. Consecutive nine groups of pixels $(B_0-B_n)$, $(B_1-B_{n+1})$, ..., $(B_8-B_{n+8})$ are assumed on the reference section of the image sensor 12. Signals $(Ib_0-Ib_n)$, $(Ib_1-Ib_{n-1})$, ..., $(Ib_8-Ib_{n+8})$ from these groups are brought one by one into comparison with pixel signals $(Ia_0-Ia_n)$ from the pixels $(A_0-A_n)$ of the base section, and the pixel signals from the reference section which shows the highest degree of coincidence is picked up. The detection of coincidence may be conducted by, for example, calculating the following formula for each of nine groups (j=0, 1, ..., 8) and determining the group which minimizes the value of this formula.

$$\sum_{i=0}^{n} |Ib_{i+j} - I_{ai}|$$

It is assumed here that the pixel signals $(Ia_0-Ia_n)$ from the pixels $(A_0-A_n)$ of the base section is most closely approximated by the signal group $(Ib_4-Ib_{n+4})$. In such a case, the distance between the pixel group $(B_4-B_{n+4})$ of the reference section and the pixel group $(A_0-A_n)$ of the base section is determined as the distance between the images I and II. It is assumed also that the pixels $A_0$ and $B_0$ are a-th and b-th pixels of the images sensor 12. In such a case, the distance between the images is given by (b+4−a). Representing the pixel pitch by d, the image distance lx is determined by the following formula (1).

$$lx = (b+4-a) \times d \quad (1)$$

Representing the distance between the images I and II in the in-focus state of the photographic lens by $l_0$, the defocus amount is given as follows.

$$DF = K \times \{(b+4-a) \times d - l_0\} \quad (2)$$

Where, K represents a constant peculiar to the focus detection optical system as used. This defocus amount DF also contains information concerning the direction of the defocus. Namely, plus and minus values of the defocus amount respectively correspond to the rear-and front-focus states. The range of the defocus amount DF detectable by this calculation is given as follows.

$$K \times \{(b-a) \times d - l_0\} \leq DF \leq K \times \{(b+8-a) \times d - l_0\} \quad (3)$$

Thus, the defocus amount DF is detectable provided that defocus amount DF falls within the range given by the formula (3). The range of the defocus amount DF represented by the formula (3) will be referred to as defocus coverage range, hereinafter.

Methods for accurately determining the distance between two images I and II through detection of coincidence are disclosed in Japanese Patent Unexamined Publication (KOKAI) Nos. 59-126517 and 60-4914 of the same applicant, so that further description is omitted in this connection.

A description will be given of a contrast value C, a correlative level value YM and a pixel signal peak value P which are used in the evaluation of credibility of the defocus amount DF and the judgement as to illumination by an auxiliary illumination device.

The peak value P of the pixel signal is defined as the greatest one of the pixel signals $Ia_0$ to $Ia_n$ of the pixels of base section used in the calculation of the defocus amount DF and, therefore, can be expressed as follows.

$$P = \max \{Ia_0 \ldots Ia_n\} \quad (4)$$

On the other hand, the contrast value C is defined by the following formula.

$$C = \sum_{k=0}^{n} |I_{ak} - I_{ak+1}| \quad (5)$$

The correlative level value YM is defined as follows. A coincidence degree function H(l) is expressed by the following formula (6).

$$H(l) = \sum_{k=0}^{n} |Ia_k - Ib(k+l-1)| \quad (6)$$

$$l = 1, 2, \ldots, 9$$

The correlation level value YM is then determined by normalizing, by the contrast value C, the smallest value of the coincidence degree function H(l) among the values obtained with l varied from 1 to 9.

Thus, the correlation level value YM can be determined as follows.

$$H\min(l) = \text{Min} \{H(1), H(2), \ldots H(9)\} \quad (7)$$

$$YM = H\min(l)/C \quad (8)$$

The reason why the coincidence degree function H(l) is normalized by the contrast value C is because the coincidence degree function H(l) has a dependency on the contrast value.

The correlative level value YM defined by the formula (8) is determined on the basis of the pixel pitch by employing an integer l. As a matter of fact, however, there is a case where the coincidence degree function is minimized at a position between two adjacent pixels. The position 1 min at which the coincidence degree function H(l) is actually minimized can be determined by an interpolation. Thus, the correlative level value YM can be obtained with a higher degree of accuracy by using the minimum value Hmin(l) of the coincidence degree function at the position lmin determined through an interpolation executed on the formula (8). A method of such an interpolation is described in detail in Japanese Patent Unexamined Publication (KOKAI) 59-126517.

The credibility or reliability of the calculated defocus amount DF is low under the following conditions: namely, (a) when the photographing object is comparatively dark, i.e., when the pixel peak value P is below a predetermined level, (b) when the contrast of the photographing object is low, i.e., when the contrast value C is below a predetermined level, and (c) when the correlative level value YM is higher than a predetermined level. Such conditions will be collectively referred to as "low-contrast condition" hereinafter.

A description will be given hereinafter of an auto-focus camera incorporating an automatic focus control device of the present invention.

Figure 1:
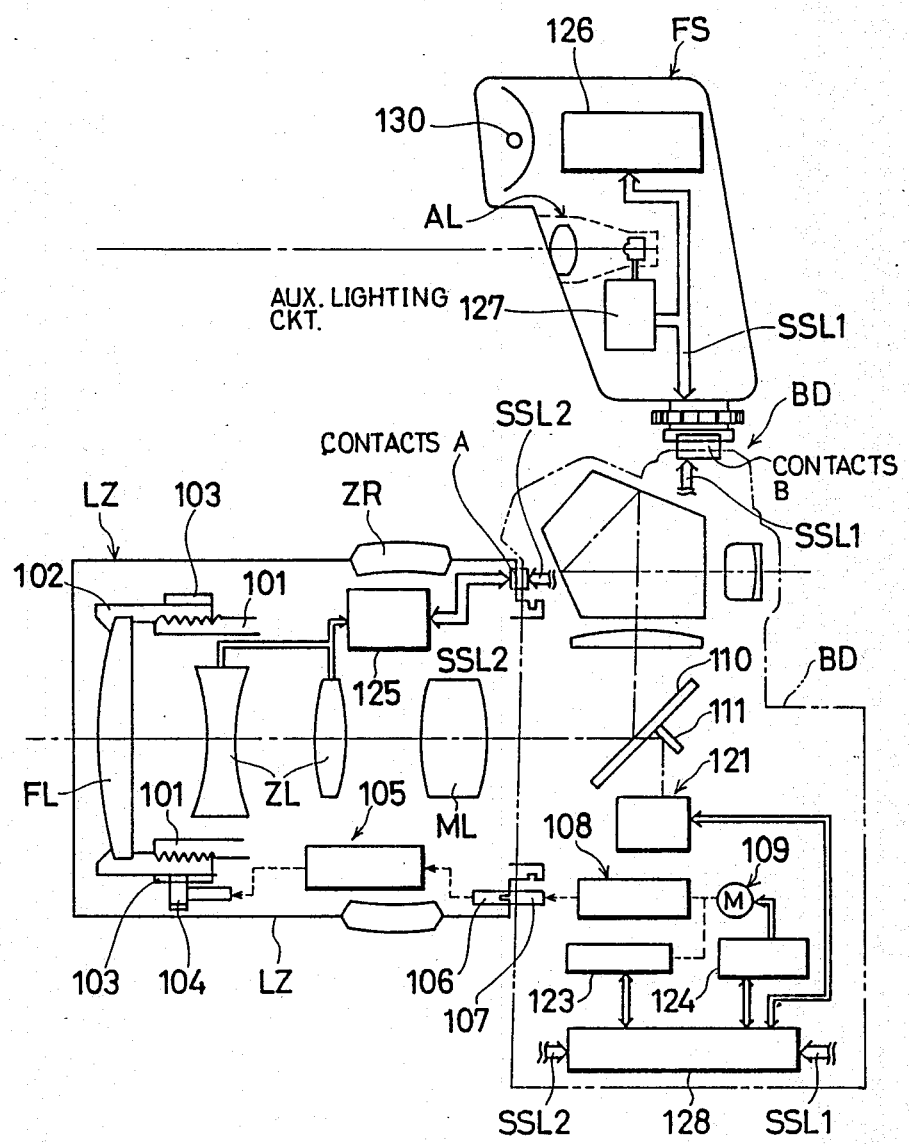
FIG. 1 is a block diagram of an auto-focus camera, to which the present invention is applied.

Referring to FIG. 1 showing the construction of a camera partly in a block diagram, a camera body BD is shown by a two-dot-and-dash line. A zoom lens LZ as an example of ex-changeable lens mountable on the camera body BD is shown on the left side of the camera body BD. An electronic flash device FS incorporating an auxiliary lighting device AL is shown in the upper side of the camera body BD.

The camera body BD and the zoom lens LZ are mechanically connected to each other through clutches 106 and 107. Electrical connection between the camera body BD and the zoom lens LZ is accomplished through a group of contacts A. The electronic flash device FS is electrically connected to the camera body BD through a group of contacts B.

The optical arrangement is such that a light shown by one-dot-and-dash line, which has passed through the focussing lens FL of the zoom lens LZ, zooming lens ZL and master lens ML of the zoom lens LZ is mostly reflected by a main mirror 110 to impinge upon a finder (not shown), while the remaining portion which is passed through a semitransparent portion of the main mirror 110 so as to be led to a focus sensor module 121 through a sub-mirror 111.

The focus sensor module 121 is electrically connected to an auto-focus controller 128. A lens circuit 125 provided in the zoom lens LZ is electrically connected to the controller 128 through signal lines SSL2 via the contact group A. The auto-focus controller 128 calculates the defocus amount DF in accordance with the information from the focus sensor module 121. The auto-focus controller 128 also calculates the amount of movement of the focussing lens FL necessary for attaining an in-focus state, in accordance with the lens information derived from the lens circuit 125, a focal length value set by the manual rotation of the zoom ring ZR by the photographer and the calculated defocus amount DF, and converts this amount of movement into the number of rotation of a lens driving motor 109.

A description will be given hereinafter of the construction for effecting power transmission for the purpose of focus control.

A motor driving circuit 124 for driving the lens driving motor 109 and an encoder for monitoring the speed or the number of ratation of the motor 109 are connected to the auto-focus controller 128, so that the lens driving motor 109 is controlled in accordance with the number of rotation determined by the auto-focus controller 128. The power of the lens driving motor 109 is transmitted to a ring gear 103 provided on the outer periphery of a focus control member 102 of the above-mentioned focussing lens FL, through the driving mechanism 108 in the camera body BD, clutches 106, 107, a transmission mechanism 105 on the zoom lens LZ and a pinion 104. A female helicoid is formed in the inner peripheral surface of the focus control member 102 for meshing engagement with a male helicoid provided on a stationary part 101 which is integral with a lens mount. In consequence, the focussing lens FL is moved back and forth by the rotational power transmitted to the ring gear 103, thereby performing a focus control.

The electronic flash device FS is connected to the auto-focus controller 128 through signal line SSL1 via the contact group B, so that starting and stopping of a flash discharge tube 130 and an auxiliary lighting device AL in the electronic flash device are controlled by the auto-focus controller 128.

Figure 2:
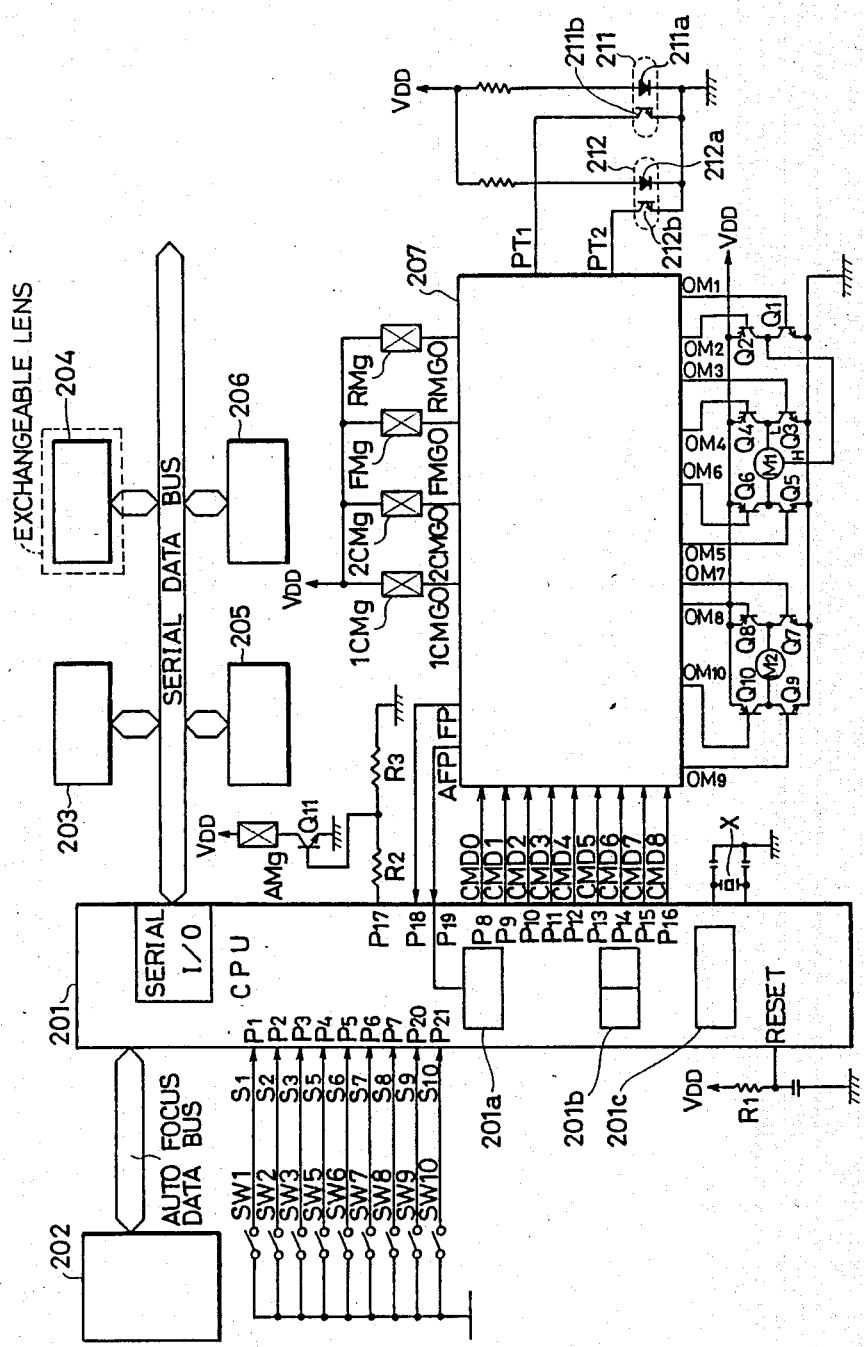
FIG. 2 is a circuit diagram showing essential parts of the auto-focus camera shown in FIG. 1.

FIG. 2 shows, in a block diagram, electrical circuits which are incorporated in the camera of the present invention. The camera has a CPU 201 which performs various controls such as a sequence control of the camera operation, calculation of exposure control values and control of exposure and calculation for the auto-focus operation. To this end, the CPU 201 has an auto-focus data bus, a serial data bus and input/output terminals $P_1$ to $P_{21}$. A focus detecting section 202 has a linear self-scanning imaging device such as a charge-coupled device (referred to as "CCD" hereinafter), CCD driving unit, A/D converter, a reference voltage source for A/D conversion, and so forth. The focus detecting section 202 has a function for measuring the amount of defocus of the photographic lens. Image signal produced by the CCD in the focus detecting section 202 is delivered to the CPU 201 through the auto-focus data bus which calculates the amount of defocus. A display section 203, composed of a liquid crystal device (LCD) or light-emitting diodes (LED), is capable of displaying various data such as automatically controlled exposure data (referred to as "AE" hereinafter), e.g., shutter time value Tv and aperture value Av calculated by the CPU 201, state of focussing, e.g., in-focus or defocus, photographing mode, and so forth. The lens data circuit 204 is provided for each of the ex-changeable lenses, and has a function for storing data peculiar to each lens such as the fully open aperture value, minimum aperture size value, focal length, and lens drive amount conversion coefficient necessary for the focus control.

When each ex-changeable lens is mounted on the camera body, the above-mentioned data are transmitted to the CPU 201 in the camera body through the contact group A which is provided int eh vicinity of the lens mount.

A photometry section 205 is composed of a light-receiving photoelectric element, A/D converter, A/D conversion reference voltage source, and a data exchanging portion for exchanging data with the CPU 201. The photometry section 205 is capable of metering the light which is transmitted through the photographic lens, thereby measuring the brightness value Bv of the photographic object.

A film sensitivity reading section 206 is capable of automatically reading the film sensitivity data provided on the surface of a film cartridge loaded in the camera, through an electrical contact group (not shown) provided in a film containing chamber of the camera. The information derived from lens data circuit 204, photometry section 205 and the film sensitivity reading section 206 and the information supplied to the display section 203 are delivered in the form of a serial signal to a serial input section (referred to as "I/O", hereinafter).

A driver control circuit section 207 has a function for driving a sequence motor $M_1$ which provides the power required for winding-up and re-winding the film and an auto-focus motor $M_2$ for driving the focussing lens for the purpose of auto-focus operation, as well as a function for exciting various magnets. This circuit section 207 is controlled by control signals CMD0 to CMD8 which are derived from output terminals $P_8$ to $P_{16}$ of the CPU 201.

Switches SW1 to SW3 and SW5 to SW10 are grounded at their one ends and connected at their other ends to input terminals $P_1$ to $P_7$, $P_{20}$ and $P_{21}$. The switch SW1 is set to a low level Lo in response to lifting up of the mirror 110 and to a high level Hi in response to completion of mechanical shutter cocking. The switch SW2 is set to Lo level at the time of start of the film winding-up operation and to Hi level upom completion of the film winding-up by one frame. The switch SW3 is repeatedly turned on and off during feeding of the film by one frame.

The switch SW5 is a photometry start switch which is turned on when a shutter relelase button is pressed to a first stroke. When this switch is turned on, the CPU delivers a signal for commencing photometry and focus detecting operations. Thus, if the photographic lens is in out-of-focus position, the focussing lens is driven until it reaches on in-focus position insofar as the switch SW5 is kept on. If the release button is released from the manual force, the switch SW5 is turned off so that the lens driving is ceased to stop the lens at the instant position.

The switch SW6 is adapted to be turned on when the release button is pressed down to a second stroke beyond the first stroke i.e., when the shutter button is fully pressed. If this switch SW6 is turned on while the camera is ready for releasing, the CPU 201 delivers a shutter release signal. The arrangement is such that, when the release switch SW6 is turned on, the photometry switch SW5 is kept on.

A switch SW7 is a film detection switch which is disposed in the path of travel of the film. This switch is turned off upon detection of the film and turned on when no film is detected. Turning on of this switch from the off state during re-winding of the film indicates that film has been almost re-wound into film cartridge with its end emerging from the slit of the film cartridge. Thus, the switch SW7 functions as a switch for confirming completion of re-winding of the film. The switch SW8 is a film cartridge detection switch disposed in the vicinity of the above-mentioned constants of the film sensitivity reading section 206. This switch is turned on when a film cartridge is loaded in the film containing chamber while the rear lid of the camera has been closed. Thus, this switch SW8 is kept off whenever the film containing chamber is empty. The switch SW9 is a rear lid switch which is turned on in response to complete closing of the rear lid. The switch SW10 is a multiple exposure mode switch. This switch, when in on state, permits a multiple exposure to be executed.

A reset terminal RESET is pulled up to $V_{DD}$ by a resistor R1. The arrangement is such that the CPU 201 is reset when the level of this reset terminal RESET is changed from Lo to Hi. A quartz oscillator X is designed to deliver clock signals to the CPU 201.

A description will be given hereinafter as to the driver control circuit section 207 and various actuators.

A magnet 1CMg is intended for holding a preceding shutter curtain of a focal plane shutter, while a magnet 2VMg is capable of holding a trailing shutter curtain. These magnets are connected commonly o the $V_{DD}$ at their one ends, while the other ends of these magnets are connected to the control output lines 1CMGO and 2CMGO of the driver control section 207. When the control output line 1CMGO is set to Lo, the magnet 1CMg is energized so that the preceding shutter curtain is held. Similarly, when the control output line 2CMGO is set to Lo, the magnet 2CMg is energized so as to hold the trailing shutter curtain. The shutter time value or shutter speed is determined as the time interval between release of the preceding shutter curtain and release of the trailing curtain.

A magnet FMg is a magnet for retaining diaphragm of the photographic lens, while a magnet RMg is intended for releasing the shutter mechanism. These magnets are connected at their one ends to the $V_{DD}$ while the other ends are connected to the control output lines FMGO and RMGO of the driver control section 207, respectively. When the control output line FMGO is set to Lo level, the magnet FMg is energized to hold the diaphragm retaining member. When the holding force is dismissed, the retaining member operates to interrupt the stopping down operation of the diaphragm at a desired opening.

When the control output RMGO is held at Lo level for a predetermined period of time, the shutter release member is dismissed so that the diaphragm is stopped down toward the minimum aperture opening value and the main mirror is raised.

The sequence motor $M_1$ has two types of coils therein so that both a high-torque/low-speed characteristic (Low characteristic) and a low-torque/high-speed characteristic (High characteristic) are available. Transistors $Q_1$ to $Q_6$ are incorporated in the circuit for driving the sequence motor $M_1$ so as to perform a changeover between the Low- and High-characteristics, as well as control of the rotation direction for each characteristic. More specifically, the H terminal of the motor $M_1$ is connected to a point to which both the transistors $Q_1$ and $Q_2$ are commonly connected. On the other hand, the L terminal of the motor $M_1$ is connected to a point to which the transistors $Q_3$ and $Q_4$ *are commonly connected. The remaining common terminal is connected to a point to which the transistors $Q_5$ and $Q_6$ are commonly connected.* In consequence, the state of operation of the sequence motor $M_1$ is controlled in a manner shown in Table 1, in response to changes in the states of the transistors $Q_1$ to $Q_6$. In this embodiment, the High brake is not used: namely, only the Low brake is used. The term "brake" therefore means the Low brake.

The auto-focus motor $M_2$ is adapted for driving the focussing lens FL. Transistor $Q_7$ to $Q_{10}$ are used for driving the auto-focus motor $M_2$. These transistors $Q_7$ to $Q_{10}$ are connected in the form of a bridge so as to enable the direction of rotation of the auto-focus motor $M_2$, to be changed from forward to backward and vice versa. The focussing lens FL is extended as the auto-focus motor $M_2$ rotated forward, while the backward operation of the same motor $M_2$ causes the lens to be retracted. These transistors $Q_1$ to $Q_{10}$ are controlled by switching the control signals which are delivered through signal lines $OM_1$ to $OM_{10}$.

A diaphragm encoder 211 and the auto-focus encoder 212 are composed of photo-interrupters and are connected to the driver control circuit section 207 through control inversion input terminal lines $PT_1$ and $PT_2$. The diaphragm encoder 211 is intended for monitoring the stroke of a diaphragm pre-set lever at the time of shutter release. Namely, when the shutter mechanism is released, a light-emitting diode 211a emits a light which is detected by a photo-transistor 211b the output of which is input to the driver control circuit section 207 through the control signal line $PT_1$. The signal is then shaped into a pulse by the driver control circuit section 207 and the pulse thus formed is input to the terminal $P_{18}$ of the CPU 201 through the control signal line FP. The encoder 212 is intended for monitoring the operation of the lens driving motor $M_2$, i.e., the amount of movement of the focussing lens, when the camera operates in the auto-focus mode. The encoder 212 has a light-emitting diode for emitting a light which is received by a photo-transistor 212b. The output from this photo-transistor 212b is input to the driver control section 207 through the control signal line $PT_2$. The signal is then shaped and delivered to a terminal $P_{19}$ of the CPU 201 through a control signal line AFP. The signal carried by the control signal line AFP also is input to a counter 201a in the CPU 201 so as to be used for the purpose of monitoring of current position of the focussing lens. More specifically, the counter 201a is cleared when the focussing lens is positioned at the infinite end photographing position $\infty$ and up-counts as the focussing lens is driven to focus nearer points. Obviously, the counter down-counts as the lens is driven towards the infinite end $\infty$. It is therefore possible to detect the amount of extension of the focussing lens in terms of the distance from the infinite end $\infty$ in the form of number of pulses counted by the counter 201a. The CPU 201 also incorporates a timer 201a capable of counting internal clock so as to read time.

The control signal lines $CMD_0$ to $CMD_8$ are used for transmitting signals which are output from output terminals $P_8$ to $P_{16}$ of the CPU 201 for the purpose of controlling the driver control circuit section 207. More specifically, the control signal lines $CMD_0$ and $CMD_1$ are intended for controlling the control signal lines RMGO and FMGO for controlling the magnets RMg and FMg, respectively, while the control signal lines $CMD_2$ and $CMD_3$ respectively control the control signal lines 1CMGO and 2CMGO for controlling the magnets 1CMg and 2CMg. The control signal lines $CMD_4$ to $CMD_6$ are capable of controlling control signal lines $OM_1$ $OM_6$ for driving the sequence motor $M_1$. The control signal lines $CMD_7$ and $CMD_8$ control the control signal lines $OM_7$ to $OM_{10}$ which control the driving of the auto-focus motor $M_2$. Table 2 shows the logical values of signals on the control signal lines $CMD_4$ to $CMD_6$ and the control signal lines $OM_1$ to $OM_6$ for controlling the sequence motor $M_1$. Table 3 shows the logical values of signals on the control signal lines $CMD_7$, $CMD_8$ and the control signal lines $OM_7$ to $OM_{10}$ for controlling the auto-focus motor $M_2$.

A magnet AMg is a retainer dismissing magnet for retaining a film winding mechanism. This magnet is grounded at its one end to the $V_{DD}$ while the other end is connected to an output terminal $P_{17}$ of the CPU 201 through a transistor $Q_{11}$ and a resistor $R_2$. The point of connection between the transistor $Q_{11}$ and the resistor $R_2$ is grounded through a resistor $R_3$. The output terminal $P_{17}$ of the CPU 201 is usually set to Lo level so that the transistor $Q_{11}$ is normally not conductive. The magnet AMg therefore is not energized so that an attractable member is held on a permanent magnet (not shown). However, as the output terminal $P_{17}$ of the CPU 201 is set to Hi level, the magnet AMg is energized to lose its attracting force of the permanent magnet so as to disengage a wind-stop member and a wind-stop lever of the film winding mechanism from each other. The CPU 201 incorporates a so-called EEPROM 201c which is electrically writable and readable and which can hold the content thereof even in the event of a power failure.

TABLE 1

| STATES OF TRANSISTORS | | | | | | STATE OF |
|---|---|---|---|---|---|---|
| Q1 | Q2 | Q3 | Q4 | Q5 | Q6 | SEQUENCE MOTOR $M_1$ |
| OFF | OFF | OFF | ON | ON | OFF | Low . FORWARD |
| OFF | OFF | ON | OFF | OFF | ON | Low . BACKWARD |
| OFF | ON | OFF | OFF | ON | OFF | High . FORWARD |
| ON | OFF | OFF | OFF | OFF | ON | High . BACKWARD |
| OFF | OFF | OFF | OFF | OFF | OFF | OFF (STOP) |
| OFF | OFF | ON | OFF | ON | OFF | Low . BRAKE |
| ON | OFF | OFF | OFF | ON | OFF | High . BRAKE |

TABLE 2

| CONTROL INSTRUCTION FROM CPU | | | OUTPUT FROM DRIVER CONTROLLER | | | | | | STATE OF SEQUENCE |
|---|---|---|---|---|---|---|---|---|---|
| CMD4 | CMD5 | CMD6 | OM1 | OM2 | OM3 | OM4 | OM5 | OM6 | MOTOR $M_1$ |
| H | L | L | L | H | L | L | H | H | Low . FORWARD |
| L | H | L | L | H | H | H | L | L | Low . BACKWARD |
| H | L | H | L | L | L | H | H | H | High . FORWARD |
| L | H | H | H | H | L | H | L | L | High . BACKWARD |
| H | H | H | L | H | L | H | L | H | OFF (STOP) |
| L | L | L | L | H | H | H | H | H | Low . BRAKE |
| L | L | H | H | H | L | H | H | H | High . BRAKE |

TABLE 3

| CONTROL INSTRUCTION FROM CPU | | OUTPUT FROM DRIVER CONTROLLER | | | | STATE OF SEQUENCE |
|---|---|---|---|---|---|---|
| CMD7 | CMD8 | OM7 | OM8 | OM9 | OM10 | MOTOR $M_1$ |
| L | H | L | L | H | H | FORWARD |
| H | L | H | H | L | L | BACKWARD |
| H | H | L | H | L | H | OFF (STOP) |
| L | L | H | H | H | H | BRAKE |

Figure 3A:
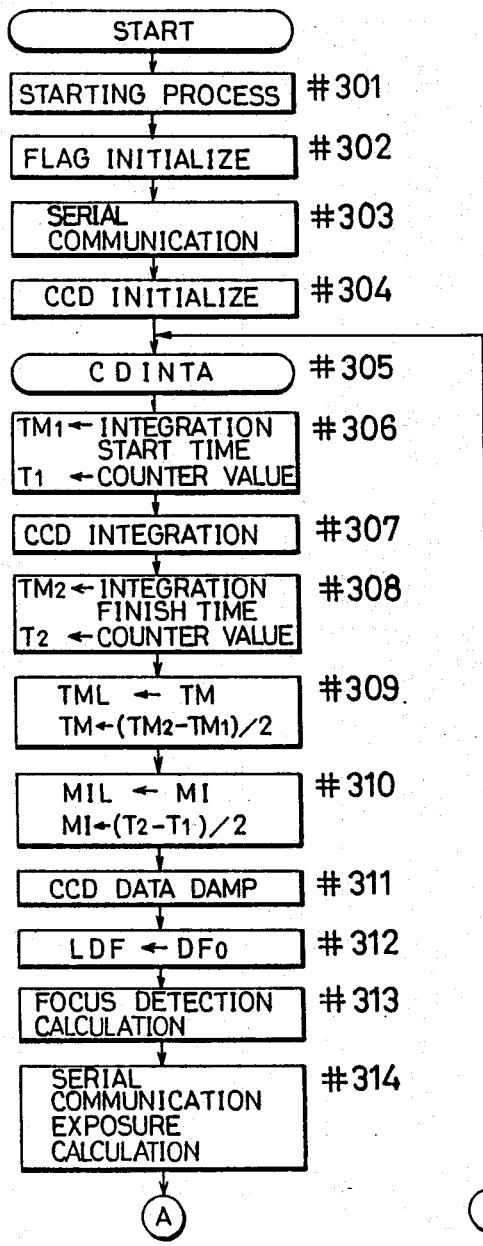

The sequence of operation of this embodiment will be explained with reference to a flow chart shown FIG. 3. The process shown in FIG. 3 begins with the turning on of the detection switch SW5 in response to pressing of the shutter release button to its first stroke. When this switch SW5 is off, the camera is in a so-called sleep mode in which only minimum power is consumed to reduce the power consumption. Clock oscillation is started and the CPU starts to operate in response to turning on of the switch SW5. As the CPU 201 is started, it delivers a start signal and the clocks to peripheral circuits and initialization of ports, flags and memories in the CPU 201 is executed (# 302). Then, serial data communication is executed between the CPU 201 and various peripheral circuits such as the inputs of switches on the camera body, electronic flash device, display element and so forth (# 303). Then, residual charges are removed from the CCD as the focus detection device, thereby initializing the same (#304). Then, a main loop is commenced with CDINTA (#305). The time at which the integration of charges on the CCD is commenced is read from the timer 201$b$ in the CPU 201, in advance of the start of the integration. The read time is saved in a memory TM1. At the same time, the counter value at the instant of commencement of the integration is read from the counter 201$a$ and is saved in the memory T1 (#306). Then, integration (accumulation of charges) is conducted in the CCD to a level suitable for detection of the focus (#307). When the integration in the CCD is finished, the time at which the integration is finished and the value in the counter at the instant at which the integration is finished are stored in the memory TM2 and in the memory T2, respectively (#308). Subsequently, the value of the memory TM is stored in the memory TML, while a value (TM2−TM1)/2 is stored in the memory TM (#309). The same storage is excelled also for the counter value. Namely, the value in the memory MI is stored in the memory MIL and the value (T2−T1)/2 is stated in the memory MI (#310).

The value (TM2−TM1)/2 represents the time which is midst of the period of integration in the CCD (this time will be referred to as "integration mid time"). Thus, the value (T2−T1)/2 represents the value in the counter at the integration mid time. As explained before, the value in the counter corresponds to the lens position so that the counter value T1 and T2 indicate the lens positions at the instants of start and finish of the integration and, therefore, the value (T2−T1)/2 represents the lens position at the integration mid time. Thus, the steps #309 and #310 are the steps for storing the integration mid time of the immediately preceding measuring cycle and the lens position at this integration mid time in the memories TML and MIL and for storing the integration mid time of the present measuring cycle and the lens position at this integration mid time in the memories TM and MI, respectively.

Then, data dump is performed for inputting pixel data of the CCD in the CPU 201. Namely, the value of the defocus amount Df of the preceding measuring cycle stored in the memory $DF_0$ is stored in the memory LDF(#311, #312). The operation of the step #312 is conducted for the purpose of shifting the previous data to the memory DFL when the focus detection calculation in the present measuring cycle is commenced with the dumped CCD pixel data, in order to allow the defocus amount detected in the present measuring cycle to be stored in the memory $DF_0$.

Subsequently, a focus detection calculation is commenced on the basis of the CCD pixel data integrated in the step #307, and calculation is performed to determine the amount $DF_0$ of defocus of the focussing lens, direction of the defocus and the credibility of the focus detection (#313). Subsequently, in a step #314, the above-mentioned serial communication and the exposure calculation are performed and operations such as display of the photometric values and detection of states of switches are executed. For instance, turning off of the switch SW5 during execution of the steps #307 to #314 is detected in the step #314 in which operation are performed to turn off the display and motors, thus resetting the camera to the sleeping mode again.

Figure 5:
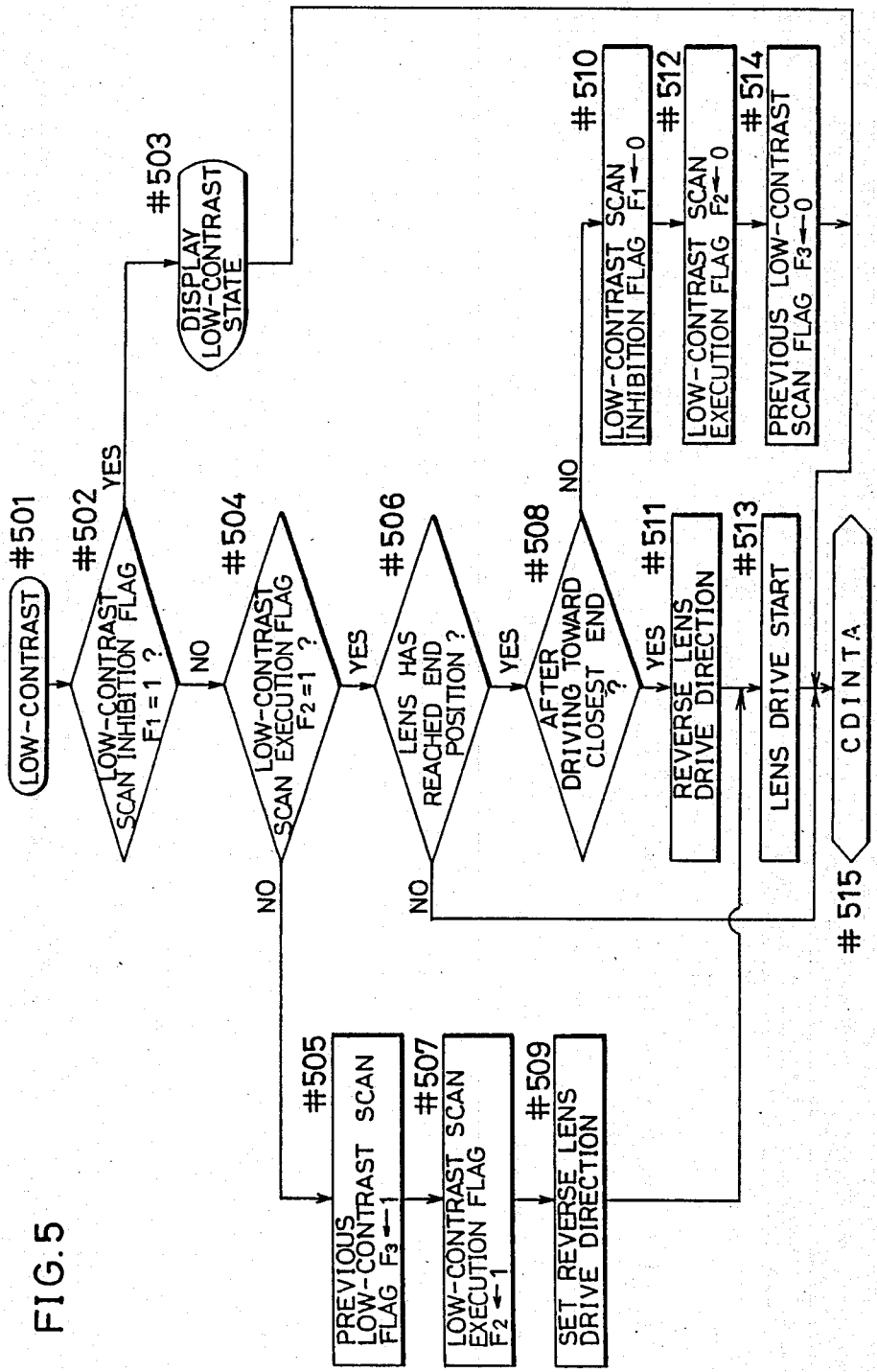

Subsequently, the credibility of the focus detection computed in the step #313 is evaluated (#315). If the credibility is judged to be low, i.e., in case of the low contrast state, the process proceeds to a step #501 (FIG. 5) in which a low-contrast scan routine for controlling the aforementioned low-contrast scan is commenced. Conversely, when the credibility is judged to be high, the process proceeds to a step #316 and then to a step #317 so that a low-contrast scan inhibition flag $F_1$ is set to 1 and a low-contrast scan execution flag $F_2$ is set to 0. Thus, the flags are controlled so as to inhibit further execution of the low-contrast scan once the focus detection is judged to be possible during execution of the low-contrast scan.

Subsequently, the defocus amount Df detected in the step #313 is multiplied with the conversion coefficient K so that the number of driving pulses for driving the focussing lens is calculated, and the result of the calculation is stored in a memory ERRCNT (#318). Subsequently, the counter value $M_1$ at the integration mid time of the present measuring cycle (number of pulses indicative of the lens position at the integration mid time of the present measuring cycle) is subtracted from the instant counter value which represents the instant position of the lens, whereby the amount of lens movement from the instant present integration mid time till the detection of the defocus amount is determined in terms of number of pulses. The result is stored in a memory CTC (#319).

Subsequently, a judgement is executed as to whether the state of a previous low-contrast scan flag $F_3$ is 1 (#320). The previous low-contrast scan flag $F_3$ is set when the low-contrast scan is commenced in the step #501 which starts the low-contrast scan routine. The fact that the previous low-contrast scan flag $F_3$ is 1 means that the in-focus position has been detected by the focus detecting operation performed in the low-contrast scanning. In such a case, the process proceeds to a step #340. Conversely, if the state of this flag F3 is 0, the process proceeds to a step #321 for executing judgement concerning the state of focussing.

In this step #321, if the defocus amount Df obtained in the step #313 falls within a predetermined defocus amount, the CPU judges that an in-focus state has been obtained with a sufficiently high accuracy and allows the display device to display the state of accomplishment of the in-focus state (#322). Subsequently, exposure control values are calculated again and the aforementioned serial communication is executed (#323), followed by a judgement as to whether the level of the release switch SW6 has been set to Lo level (#324). If the answer is YES, the process proceeds to a step #326 which starts a release routine thereby commencing the control of the shutter release operation. Conversely, if the level of the release switch SW6 is Hi, the CPU waits for turning of the switch SW6 to Lo level, i.e., until a release instruction is given, while executing the serial communication (#325). When the judgement in the step #321 has proved that the in-focus state has not been attained, the process proceeds to a step #327 in which an OVTFS routine is commenced. In a step #328, the display of the in-focus state is turned off and, in a step #329, the driving of the auto-focus motor $M_2$ is started. In a step #330, the focussing lens is driven by an amount corresponding to the number of the driving pulses (ERRCNT). The process then returns to the CDINTA routine (#305). Thus, the routine of the steps #305 to #321 and #327 to #330 are repeatedly executed to drive the focussing lens until the in-focus state is confirmed in the step #321.

Figure 4:
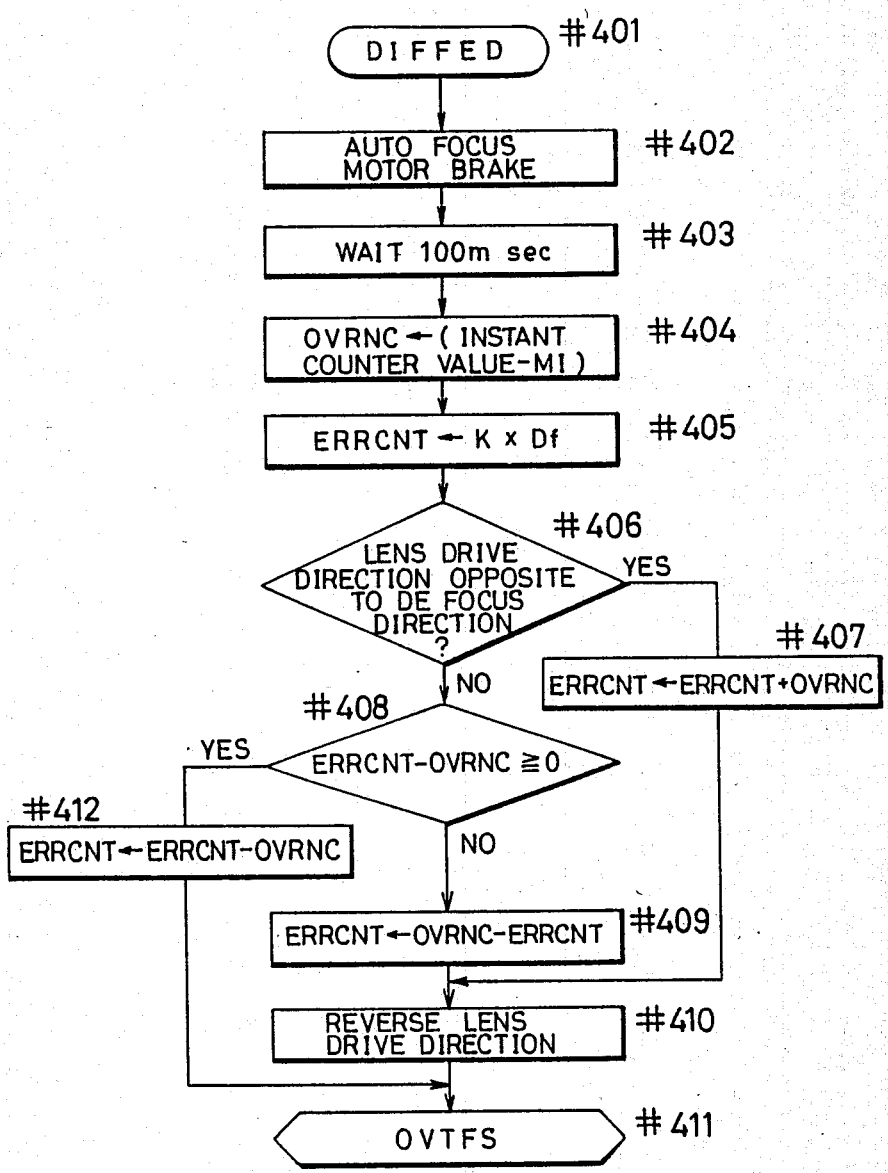

When the judgment in the step #320 is judged as being previous low-contrast scan, the process shunts to a step #340. After the previous low-contrast scan flag $F_3$ is cleared to 0 (#340), a judgement is executed as to whether the direction of the defocus as obtained in the step #313 is the same as the present direction of the lens driving (#341). A fact that the direction is not the same means that the focussing lens has been moved beyond the in-focus position. In such a case, the process shunts to a step #345 so as to commence the reversing without delay so that a later-mentioned DIFFED routine (reverse process routine) is executed in a step #401 (FIG. 4).

Conversely, if the lens driving direction is the same as the direction of the defocus, the number of the pulses (CTC) corresponding to the amount of movement of the focussing lens during the present focus detection cycle is subtracted from the number of the driving pulses (ERRCNT) obtained in step #318 and a judgment is executed as to whether the result is greater than 0 or not. Whether the result is greater than 0 or not means whether the in-focus position is in the same direction as the direction of driving of the focussing lens. A fact that the result of the subtraction is below 0 means that the focussing lens has already passed the in-focus position. In such a case, the process proceeds to a step #345 so as to start the reversing process without delay, thus commencing the DIFFED routine of the step #401.

If the judgment in the step #342 has proved that the result of the subtraction is greater than 0, i.e., positive, a value which is obtained by subtracting the pulse number (CTC) corresponding to the amount of the lens movement is subtracted from the driving pulse number (ERRCNT) and the result of the subtraction is stored in the memory ERRCNT (#343). That is, the content of the memory ERRCNT is updated to represent the new data which shows the number of the driving pulses required for driving the focussing lens from the instant position to the in-focus position. Subsequently, the pulse number (constant) stored in a memory NZC is subtracted from the remaining driving pulse number (ERRCN) and a judgment is executed as to whether the result of the subtraction is greater than 0 (#344). The constant value stored in the memory NZC is the maximum number of pulses corresponding to the distance over which the focussing lens moves due to the inertia of the lens itself and the auto-focus motor $M_2$ until the lens is actually stopped after the braking of the auto-focus motor $M_2$.

If the result of judgment in the step #344 has proved to be below 0, there is a possibility that the lens will undesirably move beyond the in-focus position. In such a case, the process shunts to the DIFFED routine (reverse processing routine) which begins with the step #345. Conversely, if the judgment in the step #344 has proved that the result of the subtraction is positive, the focussing lens has not reached yet the in-focus position. In this case, therefore, the process proceeds to a step #327 to continue the focussing operation.

The DIFFED routine (reversing process routine) of the step #345 shown in FIG. 3 will be described with reference to FIG. 4.

In order to stop the focussing lens without delay, a brake is put into effect on the auto-focus motor $M_2$ (#402). The CPU then waits for elapse of a predetermined time, e.g., 100 m sec, which is enough to completely stop the focussing lens (#403). Then, the instant lens position is read from the counter 201b and a pulse count number obtained by subtracting the count value MI of the CCD integration mid time is stored in the memory OVRNC (#404). This pulse count number OVRNC represents the pulse count number corresponding to the distance over which the lens has moved to the instant lens stop position after the instant of the present focus detection. Then, the defocus amount Df detected in the present cycle is multiplied with the conversion coefficient D so as to be converted into the number of pulses corresponding to the required amount of the movement of the focussing lens, and the determined driving pulse number is stored in the memory ERRCNT (#405).

Subsequently, a judgment is executed as to whether the direction of driving of the focussing lens is the same as the direction of the defocus (#406). If the answer is NO, i.e., if the direction are opposite, a value (ERRCNT+OVRNC) which is the sum of the pulse count number (OVRNC) and the driving pulse number (ERRCNT) is stored in the memory ERRCNT (#407) so that the focussing lens is driven in the reverse direction (#410). Conversely, if the direcitons are the same, a judgment is executed as to whether the difference (ERRCNT−OVRNC) between the driving pulse number (ERRCNT) and the pulse count number (OVRNC) is greater than 0 or not (#408). If the difference is a negative value, i.e., if the pulse count number is greater than the driving pulse number, the difference represents the amount over which the focussing lens is to be driven in the reverse direction. The value (OVRNC−ERRCNT) therefore is stored again in the memory ERRCNT (#409) so that the focussing lens is driven in the reverse direction (#410). Thee process then proceeds to a routine OVTFS #411).

However, if the judgment in the step #408 has proved that the difference between the driving pulse ERRCNT and the pulse count number OVRNC is greater than 0, the focussing lens has not reached yet the in-focus position or has just reached the in-focus position. In this case, therefore, the difference (ERRCNT−RNC) is stored in the memory ERRCNT (#412) and the process proceeds to a step #411 without reversing the focussing lens, whereby a routine OVTFS is commenced. This operation is executed for the following purpose. Namely, the focussing lens may actually stop at a position within the maximum distance of movement by inertia which is set in the form of a constant pulse number NZC, i.e., the lens may stop with a pulse count number which is smaller than the constant value NZC. In such a case, it is not necessary to reverse the focussing lens. The routine OVTFS is executed to inhibit the reversing of the lens.

As explained before, when a low-contrast state is detected in the step #315, the low-contrast process is commenced in the step #501. This process will be described with reference to FIG. 5.

A judgment is executed in the step #502 as to whether the low-contrast scan inhibition flag $F_1$ has been set to 1. If this flag $F_1$ has been set to 1, a low-contrast state is displayed (#503) and then the process proceeds to a step #515. The process then returns to the routine CDINTA of the step #315. If the state of the low-contrast scan inhibition flag $F_1$ is 0, a judgment is executed as to whether the present low-contrast scan execution flag $F_2$ has been set to 1 (#504). If this flag $F_2$ has been set to 0, an operation is executed to set both the previous low-contrast scan flag $F_3$ and the low-contrast scan execution flag $F_2$ to 1 whereby the direction of driving of the focussing lens is set such that the lens moves away from the infinite end, i.e., towards the closest end (#505, #507, #509) and the driving of the focussing lens is started (#513). The process also returns (#515) to the step #315 in which the integration in the CCD for the focus detection is executed.

If the low-contrast execution flag $F_2$ has been set to 1, the present lens position is confirmed (#506). In this case, if the focussing lens is not at the closest end not at the infinite end, the process returns to the step #315 to execute the integration in the CCDE for the purpose of the focus detection (#515). If the focussing lens is located at the closest end or the infinite end, the direction of movement of the focussing lens immediately before the arrival at this position is confirmed (#508). If it is confirmed that the focussing lens has been driven towards the closest end, i.e., if the focussing lens is presently located at the closest end, an operation is executed to reverse the direction of driving of the focussing lens (#511). Then, the driving of the lens in this direction is commenced (#513) and the process returns (#513) to the step #315 so as to execute the integration in the CCD for the purpose of the focus detection.

Conversely, if the judgment in the step #508 has proved that the lens has been driven towards the infinite end, operations are executed to set 0 on all the flags, i.e., the low-contrast scan inhibition flag $F_1$, low-contrast scan execution flag $F_2$ and the previous low-contrast scan flag $F_3$ (#510, #512, #514). Then, the process returns to the step #315 so as to execute the integration in the CCD for the purpose of the focus detection.

Furthermore, it should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. An auto-focus camera comprising:
   focus detection means for detecting the focussing state of a photographic lens:
   reliability discriminating means for discriminating whether the result of the focus detection means is reliable;
   first drive control means for driving the photographic lens to a position determined from the result of the focus detection means when the reliability discriminating means discriminates that the result is reliable;
   second drive control means for driving the photographic lens in a predetermined direction with allowing the focus detection means and the reliability discriminating means to execute when the reliability discriminating means discriminates that the result is unreliable;
   judging means for judging whether a reverse driving of the photographic lens is necessary when the reliability discriminating means discriminates that the result of the focus detection means is reliable during the predetermined direction driving; and
   third drive control means for driving the photographic lens in the reverse direction to a position determined from the instant result of the focus detection means when the judging means judges that the reverse driving is necessary.

2. An auto-focus camera according to claim 1 wherein the third drive control means stops the driving of the second drive control means and then drives the photographic lens in the reverse direction to a position determined by the instant result of the focus detection means when the judging means judges that the reverse driving is necessary.

3. An auto-focus camera comprising:
   focus detection means for detecting the focussing state of a photographic lens;
   reliability discriminating means for discriminating whether the result of the focus detection means is reliable;
   first drive control means for driving the photographic lens to a position determined from the result of the focus detection means when the reliability discriminating means discriminates that the result is reliable;
   second drive control means for driving the photographic lens in a predetermined direction with allowing the focus detection means and the reliability discriminating means to execute when the reliability discriminating means discriminates that the result is unreliable;
   first lens position detection means for detecting the instant position of the photographic lens when the reliability discriminating means discriminates that the result of the focus detection means is reliable during the predetermined direction driving;
   stopping means for stopping the driving of the second drive control means when the reliability discriminating means discriminate that the result of the focus detection means is reliable during the predetermined direction driving;
   second lens position detection means for detecting the position at which the photographic lens is stopped by the stopping means;
   first calculation means for calculating the positional difference between the position obtained by the first lens position detection means and the position obtained by the second lens position detection means;
   second calculation means for calculating the instant defocus amount of the photographic lens when the reliability discriminating means discriminates that the result of the focus detection means is reliable during the predetermined direction driving; and
   third calculation means for calculating the driving amount of the photographic lens determined on the basis of the positional difference obtained by the first calculation means and the defocus amount obtained by the second calculation means.

4. An auto-focus camera according to claim 3 further comprising judging means for judging whether a reverse driving of the photographic lens is necessary when the reliability discriminating means discriminates that the result of the focus detection means is reliable during the predetermined direction driving.

5. An auto-focus camera according to claim 4 wherein the third calculation means calculates the driving amount by adding the positional difference obtained by the first calculation means to the defocus amount obtained by the second calculation means when the judging means judges that the reverse driving is necessary.

6. An auto-focus camera according to claim 4 wherein the third calculation means calculates the driving amount by subtracting the defocus amount obtained by the second calculation means from the positional difference obtained by the first calculation means when the judging means judges that the reverse driving is unnecessary and the positional difference is larger than the defocus amount.

7. An auto-focus camera according to claim 4 wherein the third calculation means computes the driving amount by subtracting the positional difference obtained by the first calculation means from the defocus amount obtained by the second calculation means when the judging means judges that the reverse driving is unnecessary and the defocus amount is larger than the positional difference.

* * * * *